United States Patent
Essa et al.

(10) Patent No.: US 9,600,760 B2
(45) Date of Patent: Mar. 21, 2017

(54) SYSTEM AND METHOD FOR UTILIZING MOTION FIELDS TO PREDICT EVOLUTION IN DYNAMIC SCENES

(75) Inventors: Irfan Aziz Essa, Atlanta, GA (US); Matthias Grundmann, Atlanta, GA (US); Jessica Kate Hodgins, Pittsburgh, PA (US); Kihwan Kim, Atlanta, GA (US); Iain Alexander Matthews, Pittsburgh, PA (US); Ariel Shamir, Jerusalem (IL)

(73) Assignee: Disney Enterprises, Inc., Burbank, CA (US)

( * ) Notice: Subject to any disclaimer, the term of this patent is extended or adjusted under 35 U.S.C. 154(b) by 1422 days.

(21) Appl. No.: 13/075,947

(22) Filed: Mar. 30, 2011

(65) Prior Publication Data

US 2011/0242326 A1 Oct. 6, 2011

Related U.S. Application Data

(60) Provisional application No. 61/319,242, filed on Mar. 30, 2010.

(51) Int. Cl.
*H04N 7/18* (2006.01)
*G06N 5/04* (2006.01)
*G06N 3/00* (2006.01)
*H04N 21/4728* (2011.01)

(52) U.S. Cl.
CPC ......... *G06N 3/006* (2013.01); *H04N 21/4728* (2013.01)

(58) Field of Classification Search
None
See application file for complete search history.

(56) References Cited

U.S. PATENT DOCUMENTS

| | | | |
|---|---|---|---|
| 6,545,705 B1 * | 4/2003 | Sigel et al. | 348/157 |
| 2003/0026504 A1 * | 2/2003 | Atkins et al. | 382/300 |
| 2005/0117061 A1 * | 6/2005 | Li et al. | 348/590 |
| 2006/0013480 A1 * | 1/2006 | Sano | 382/168 |
| 2007/0031062 A1 * | 2/2007 | Pal et al. | 382/284 |
| 2008/0192116 A1 * | 8/2008 | Tamir et al. | 348/157 |
| 2008/0310734 A1 * | 12/2008 | Ahammad et al. | 382/209 |
| 2009/0059007 A1 * | 3/2009 | Wagg et al. | 348/157 |
| 2009/0222388 A1 * | 9/2009 | Hua et al. | 706/12 |
| 2010/0026809 A1 * | 2/2010 | Curry | 348/157 |

* cited by examiner

*Primary Examiner* — Frederick Bailey
(74) *Attorney, Agent, or Firm* — Ference & Associates LLC (57) ABSTRACT

Described herein are methods, systems, apparatuses and products for utilizing motion fields to predict evolution in dynamic scenes. One aspect provides for accessing active object position data including positioning information of a plurality of individual active objects; extracting a plurality of individual active object motions from the active object position data; constructing a motion field using the plurality of individual active object motions; and using the motion field to predict one or more points of convergence at one or more spatial locations that active objects are proceeding towards at a future point in time. Other embodiments are disclosed.

18 Claims, 11 Drawing Sheets

SYSTEM AND METHOD FOR UTILIZING MOTION FIELDS TO PREDICT EVOLUTION IN DYNAMIC SCENES

CLAIM FOR PRIORITY

This application claims priority to U.S. Provisional Application Ser. No. 61/319,242, entitled "SYSTEMS AND METHODS FOR UTILIZING MOTION FIELDS TO PREDICT EVOLUTION IN DYNAMIC SCENES", which was filed on Mar. 30, 2010, and which is incorporated by reference here.

FIELD OF THE INVENTION

The subject matter presented herein generally relates to analyzing scenes and predicting evolution of the scene over time. More particularly, certain aspects presented herein relate to analysis of multi-object events to predict how multi-object movement evolves over time.

BACKGROUND

Understanding complex dynamic scenes, for example in team sports, is a challenging problem. This is partly because an event, such as in a game, involves not only the local behaviors of individual objects but also structural global movements. Seeing only video footage or other positioning data, it is difficult to understand the overall development of the scene and predict future events.

BRIEF SUMMARY

In summary, one aspect provides a method for predicting evolution of motions of active objects comprising: accessing active object position data stored in a memory device, said active object position data including positioning information of a plurality of individual active objects; and using one or more processors to perform: extracting a plurality of individual active object motions from the active object position data; constructing a motion field using the plurality of individual active object motions; and using the motion field to predict one or more points of convergence at one or more spatial locations that active objects are proceeding towards at a future point in time.

Another aspect provides a computer program product comprising: a computer readable storage medium having computer readable program code embodied therewith, the computer readable program code comprising: computer readable program code configured to access active object position data, said active object position data including positioning information of a plurality of individual active objects; computer readable program code configured to extract a plurality of individual active object motions from the active object position data; computer readable program code configured to construct a motion field using the plurality of individual active object motions; and computer readable program code configured to use the motion field to predict one or more points of convergence at one or more spatial locations that active objects are proceeding towards at a future point in time.

A further aspect provides a system comprising: one or more processors; and a memory device operatively connected to the one or more processors; wherein, responsive to execution of program instructions accessible to the one or more processors, the one or more processors are configured to: access active object position data, said active object position data including positioning information of a plurality of individual active objects; and extract a plurality of individual active object motions from the active object position data; construct a motion field using the plurality of individual active object motions; and use the motion field to predict one or more points of convergence at one or more spatial locations that active objects are proceeding towards at a future point in time.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 1(A-B) illustrates an example of scene evolution over time.

FIG. 2(A-D) illustrates an example of forming a top down warped image for initial player location.

FIG. 3(A-C) illustrates an example of separating foreground and background elements.

FIG. 4(A-C) illustrates an example of determining player location in a top down warped image.

FIG. 6(A-C) illustrates an example of predicting points of convergence.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of those example embodiments.

Reference throughout this specification to "embodiment(s)" (or the like) means that a particular feature, structure, or characteristic described in connection with the embodiment is included in at least one embodiment. Thus, appearances of the phrases "according to embodiments" or "an embodiment" (or the like) in various places throughout this specification are not necessarily all referring to the same embodiment.

Furthermore, the described features, structures, or characteristics may be combined in any suitable manner in different embodiments. In the following description, numerous specific details are provided to give a thorough understanding of example embodiments. One skilled in the relevant art will recognize, however, that aspects can be practiced without certain specific details, or with other methods, components, materials, et cetera. In other instances, well-known structures, materials, or operations are not shown or described in detail to avoid obfuscation.

Moreover, while example embodiments are described in detail herein with reference to a particular type of scene (a sporting event), and with reference to a particular type of objects (players within the sporting event), these are merely non-limiting examples. It will be readily understood by those having ordinary skill in the art that embodiments are equally applicable to other scenes and objects, such as large crowds of people at a public event (plays, concerts and the like). Moreover, embodiments are described in detail herein with reference to use of computer vision; however, it will be readily understood by those having ordinary skill in the art that the techniques described in detail with reference to the example embodiments may be applied to data from other sources than computer vision. For example, a motion field may be derived by computer vision, but may equally be derived from other sources such as sensors, for example worn radio frequency devices, embedded pressure sensors in the ground, radar, hand annotated video, and the like.

For predicting evolution in dynamic scenes, such as in a sporting event, a higher level information can be deduced by tracking and analyzing the objects movements, not only individually, but also as a group. It should be noted that the term "object(s)" used throughout this description takes the meaning of an "active object", such as an object having an internal source of energy for controlling motion. Non-limiting examples of active objects include human beings, animals, or even machines that move about independently, such as robots. Herein are described embodiments that build a global flow field from objects' ground-level motions. Embodiments operate on the concept that flow on the ground reflects the intentions of the group of individual objects' based on the context of the scene, and that this can be used for understanding and estimating future events.

The description now turns to the figures. The illustrated example embodiments will be best understood by reference to the figures. The following description is intended only by way of example and simply illustrates certain example embodiments representative of the invention, as claimed.

Figure 1A:
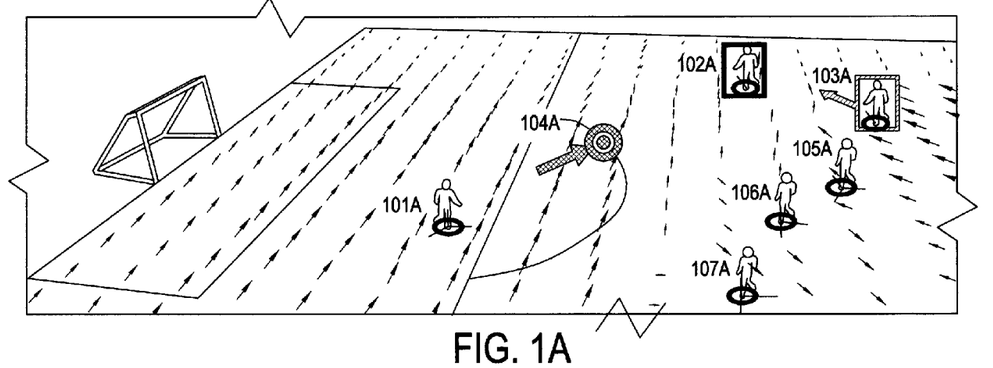
Figure 1B:
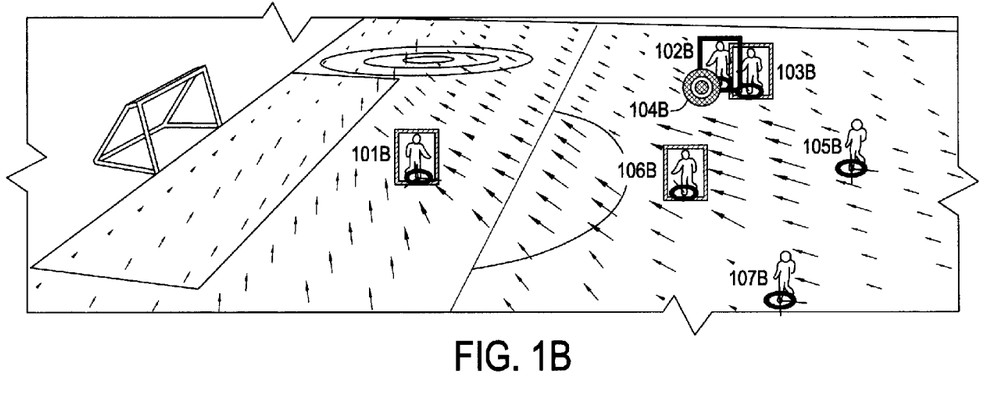
Figure 2A:
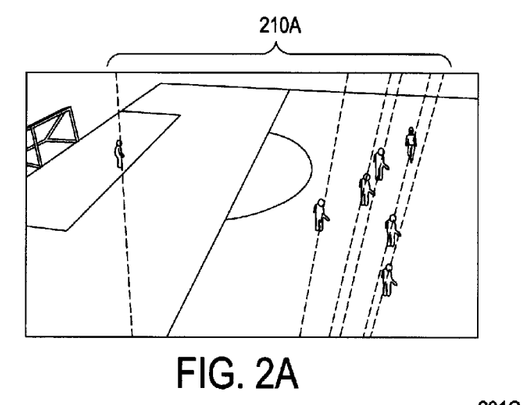
Figure 2B:
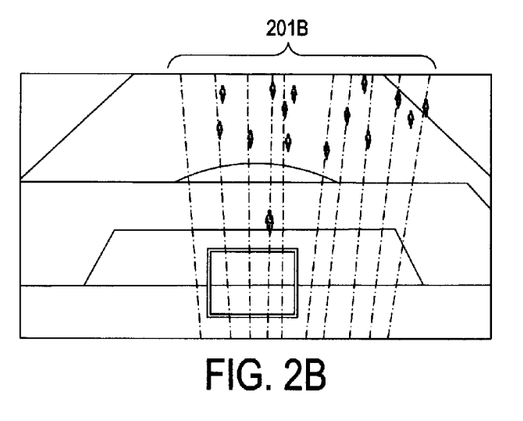
Figure 2C:
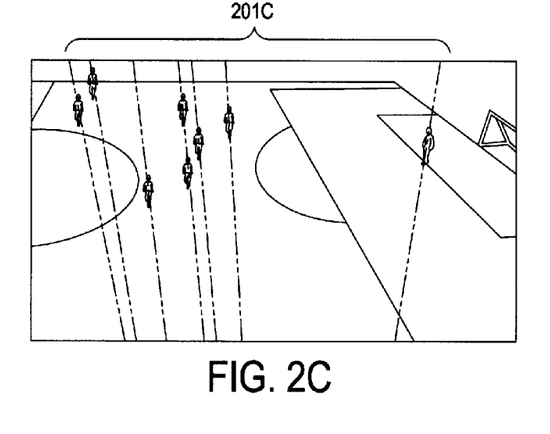

Consider for example the soccer scene in FIG. 1(A-B), which demonstrates play evolution. In FIG. 1A, at a first time, among the plurality of players (101A, 102A, 103A, 105A, 106A and 107A) the goalkeeper 101A passes the ball 104A to a nearby defender 102A (top). One of the offensive players 103A sees an opportunity to intercept the ball 104A. Thirty (30) frames later (FIG. 2B), among the plurality of players (101B, 102B, 103B, 105B, 106B and 107B), the goalkeeper 101B and another defender 106B start moving to another location to prepare to respond to an offensive interception. The players may be tracked on the ground plane to generate a flow field (shown by the arrows indicating a vector field), which in turn may be used to infer possible locations of future events, illustrated by circles in FIG. 1B.

Some primary characteristics of example embodiments described herein are thus extracting ground-level motion from individual objects' movement, which may be captured from multiple-views; generating a flow field from a sparse set of individual objects' motions (a motion field on the ground); detecting the locations where the motion field converges; and inferring the scene evolution. Various example applications for embodiments are noted throughout, and again the sport of soccer is simply used as a representative context.

Referring generally to FIG. 2(A-D), a first step in constructing a motion field is extracting tracks of individual players on the field. In the case where one is interested in accurate tracks with camera models, so as to allow for projections on the ground-plane (plane coinciding with the soccer field in the example of soccer), a multi-view tracking approach may be utilized. While camera calibration with a single camera is possible (for example, in the soccer context), better robustness for tracking may in some cases be obtained using multi-view video.

To get accurate tracks from multi-view video, the following challenges are addressed. View dependent analysis for player tracking using multiple cameras suffers from a data fusion problem. In addition, flow analysis may be sensitive to the perspective distortion of different views. To address these issues, an embodiment analyzes the game scenes from a top down warped image of the ground plane. The top down view is constructed by combining the warped footage (images) of each of the multiple cameras. An embodiment thus first extracts a multi-view consistent player location in the top down view by optimizing the geometric constraints (aligning the warped views).

This allows for extraction of the individual player's ground level motion. Through spatial and temporal interpolation, an embodiment combines these motions to create a dense motion field on the ground-plane. An embodiment analyzes the motion field to detect and localize important regions (referred to herein as points of convergence).

Some notations used herein are defined. Assume that there are N cameras. Let $I_k$ ($1 \le k \le N$) refer to a frame of each camera and $I_k^{top}$ refer to a top down image where each $I_k$ is warped through the homography $H_k^{top}$. Additionally, $x \in I^{top}$ denotes that x follows the coordinate of a top down view (ground field).

Extracting Individual Ground-Level Motion

To construct a flow field, an embodiment first extracts the ground-level motion of individual players. At each time t, this motion is defined as the velocity vector $[uv]^T$ representing a player's movement on the ground at a 2D location $x(x,y) \in I^{top}$.

To find the motion, an embodiment first detects the ground position of each player x (an optimized location near the feet in the example of soccer) at a given time t. Then, a search is made for a corresponding position in a previous frame at time t−a (where a>1 for stability and may for example be set to 5 frames). The motion velocity at time t is the difference between the two positions. Note that the individual motion is reconstructed at each time separately and does not require explicit tracking since it is only used to construct the flow field.

To find the 2D location of players on the ground, an embodiment may make use of the fact that each view (from multiple cameras) has its own vertical vanishing point (VVP) $v_k$, which for a given view is the point at which an object vanishes as it is viewed from farther away. In FIG. 2A-C, 201A-C, indicated by dotted lines, VVPs are illustrated for a view looking down from the top. From the top view, these points lie below the surface (refer to FIG. 2D).

Figure 2D:
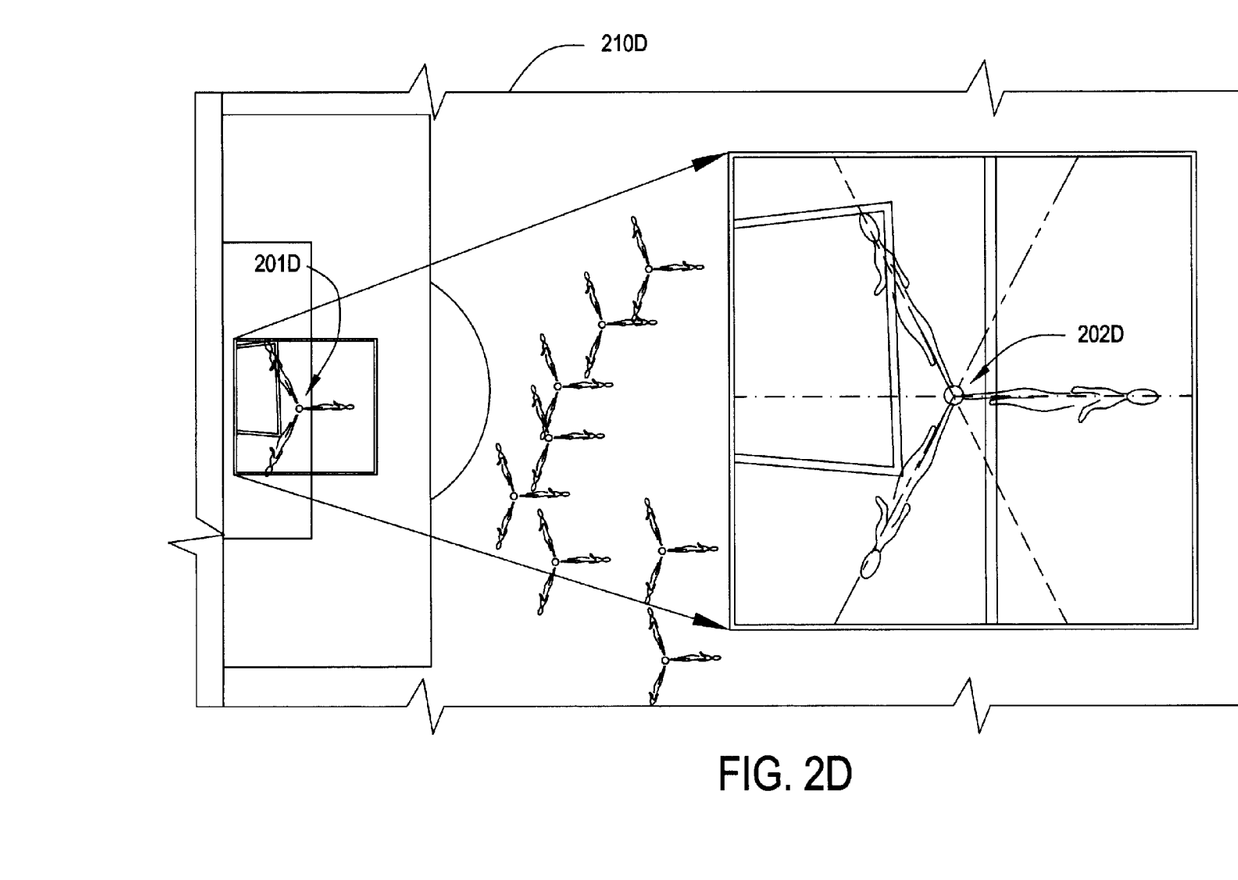

The projected VVPs onto the ground view (top down warped image) is denoted as $\hat{v} = H_k^{top} v_k$ ($1 \le k \le N$). In FIG. 2D, the warped image $I_k^{top}$ (210D) includes players (for example, the goalie is indicated at 201D) that are distorted in the direction of the projected vanishing points $\hat{v}_k$ (indicated by dotted lines in the enlargement box of FIG. 2D). Each $\hat{v}_k$ gives a unique direction in any location on the ground. As illustrated in FIG. 2D, the location of a player 201D may be identified by the intersection 202D of these projections (indicated by dotted lines in the enlargement box) on the ground plane 210D.

Using background subtraction, for each pixel in each view, a confidence measure of that pixel being part of the foreground (in this example, a player) or background (in this example, a grass field) may be defined. Combining all measures from all views on the ground plane by summing their projections and normalizing, a position confidence map, $PC:I_k^{top}[0,1]$, is obtained, where $PC_{(x)}$ is the probability that $x \in I^{top}$ is part of the foreground.

Figure 3A:
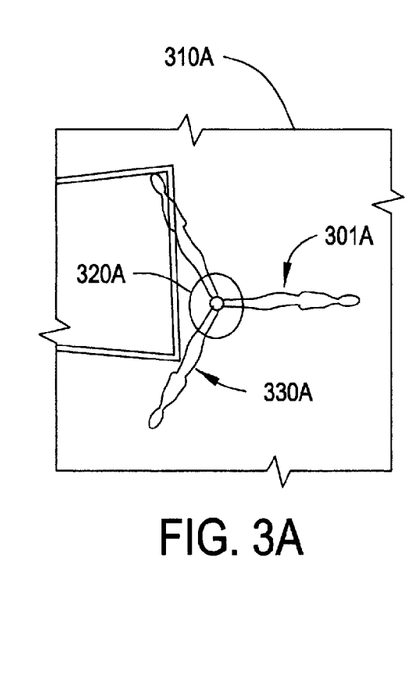
Figure 3B:
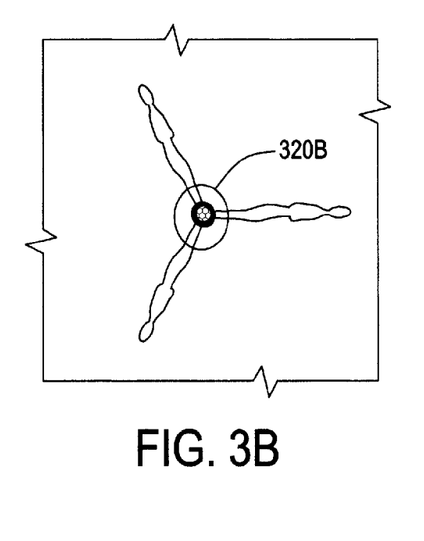
Figure 3C:
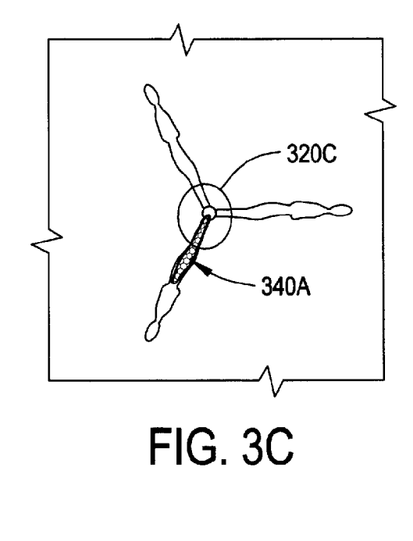

In FIG. 3A, overlapped views from each angle (each camera angle view of a player 301A has been warped over the direction of vertical vanishing points) create a top down warped image 310A. Since the region around each player's foot 320A-C is located on the ground plane where the homographies for each view are extracted, the probability of foreground in those regions will be higher than in other regions. However, if there are cast shadows, the shadow region, for example 330A, will also have high probability, as illustrated in FIG. 3C at 340. Therefore, an embodiment may consider the highest PC position only as an initial location of the player.

Figure 4A:
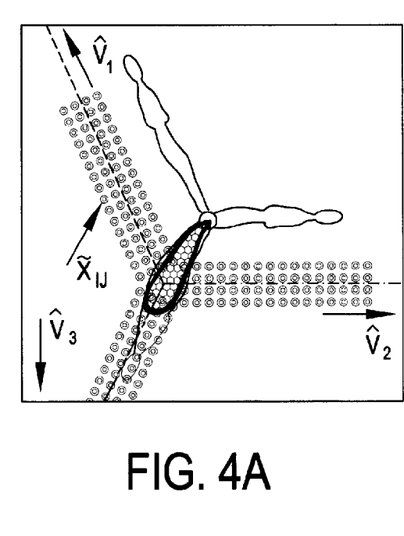
Figure 4B:
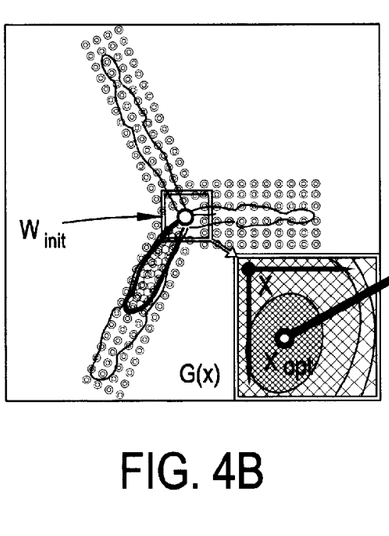
Figure 4C:
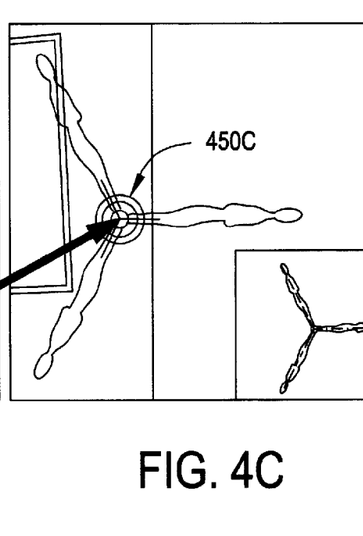

Referring to FIG. 4(A-C), a window, $W_{init}$, around the initial position is defined and may be refined based on geometric constraints. An embodiment may find the optimal location for a player using geometric constraints. In FIG. 4A, samples, $\tilde{x}_{ij}$ along lines from the evaluation point x and each projected VVP $\hat{v}_k$ are illustrated. An embodiment may make a search for the intersection point of the foreground projection of all N directions (N=number of views). This intersection is the weighted centroid of all foreground samples (x s.t. $PC(x) \neq 0$) along each projected VVP in all N directions, as illustrated in FIG. 4B. Since the number of foreground samples is small, the window moves to the top-right of the view. Evaluating equation 1 (below) at each point, $x_{ij}$, inside $W_{init}$ allows identification of the optimized location 450C.

An embodiment defines a function (G(x)) and searches for its minimum inside $W_{init}$. Function G(x) is the weighted summation of the distance between a set of foreground sample points $\tilde{x}_{i,k}$ and a line axis established by $x \in W_{init}$ and each projected vertical vanishing point $\hat{v}_k$, $$G(x) = \sum_{k=0}^{N} \sum_{i=0}^{n_k} PC(\tilde{x}_{i,k}) \cdot d(\tilde{x}_{i,k}, (\hat{v}_k - x)), \tag{1}$$

where $n_k$ is the number of foreground samples based on each direction k, and $PC(\tilde{x}_{i,k})$, the probability of being foreground, is used as the weight for each of the foreground sample points.

The evaluation based on G(x) may be performed over all directions simultaneously (in this case N=3). The optimal ground-level position of the player is $x_{opt} = \text{argmin}_{x \in W_{init}} G(x)$. Note that the set of sampling points $\tilde{x}_{i,k}$ for each $x \in W_{init}$ are organized along the line axis ($\hat{v}_k - x$). The sampling range is calculated by finding the average height of players using vanishing points. If the summation of all weights $PC(\tilde{x}_{i,k})$ for all views is too small (referring to FIG. 4A), this may be interpreted as a wrong initialization or a false-positive detection of the player and discarded.

To find the corresponding position $x_{opt}^{t-a}$ of the player in the previous frame t−a, an embodiment may establish a search window $W_{opt}$ centered around $x_{opt}$. An embodiment may use a combination of the geometric constraints $G(x)^{t-a}$ on the previous top down frame $I_{t-a}^{top}$ using equation 2 (below), and a color proximity measure $C(x)^{t-a}$:

$$x_{opt}^{t-a} = \underset{x(x,y) \in W_{opt}}{\text{argmin}} \; (G(x)^{t-a} + \beta C(x)^{t-a}) \tag{2}$$

$C(x)^{t-a}$ is a normalized Bhattacharyya distance of the color (HSV) histogram between the two sets of foreground samples used for $x_{opt}^{t}$ and $x^{t-a} \in W_{opt}^{t-a}$, respectively. The weighting factor $\beta$ is usually very small (0.1). The use of color similarity reduces the chance of matching a different player. Once $x_{opt}^{t-a}$ is found, the motion (velocity vector) at $x_{opt}$ can be defined as:

$$[uv]^T = \frac{\partial x(x,y)}{\partial t} \cong (x_{opt}^t - x_{opt}^{t-a})/a \tag{3}$$

Dense Motion Field Construction

For motion extraction, an embodiment outputs a sparse set of motions on the ground plane. To generate a ground-level dense flow field, the sparse motions are combined using Radial Basis Functions. Also, the flow is temporally interpolated using a weighted set of motions over time. As described herein, the motion at a location $x(x,y) \in I^{top}$ is defined by a velocity vector $$\left[\frac{dx}{dt} \frac{dy}{dt}\right]^T = [uv]^T.$$

Assume that $N_k$ individual players are detected at a given frame k, then the set of the positions is denoted as $\{x_1^k, x_2^k, \ldots, x_{N_k}^k\}$, and the corresponding sets of velocities for each direction are denoted as $\{u_1^k, u_2^k, \ldots, u_{N_k}^k\}$, and $\{v_1^k, v_2^k, \ldots, v_{N_k}^k\}$ for x and y directions, respectively.

A temporal kernel of size p is defined using a half Gaussian function. By applying the kernel to each entry of velocity over time, two n×1 vectors may be constructed, which are temporally smoothed versions of a to $u_i^k$ to $u_i^{k-p+1}$ and $v_i^k$ to $v_i^{k-p+1}$, respectively: $U=[U_1, U_2, \ldots, U_{N_k}, \ldots, U_n]^T$ and $V=[V_1, V_2, \ldots, V_{N_k}, \ldots, V_n]^T$ where $U_i$ and $V_i(1 \leq i \leq n)$ are scalar velocities for each direction. The matching for each entry over time is done by deterministic setting (for example, minimum distance and orientation). Note that commonly $n=N_k$ when the number of detected players does not vary over time. However, when there are fewer entries in a given frame k, compared to previous frames, n becomes larger than $N_k$.

The problem now may be stated as follows: given a collection of n scattered 2D points $\{x_1, x_2, \ldots, x_n\}$ on the ground plane, with associated scalar velocity values $\{U_1, \ldots, U_n\}$ and $\{V_1, \ldots, V_n\}$, construct a smooth velocity field that matches each of these velocities at the given locations. One can think of this solution as scalar-valued functions $f(x)$ and $g(x)$ so that $f(x_i)=U_i$, and $g(x_i)=V_i$, respectively, for $1 \leq i \leq n$.

For the case of interpolating the velocity of x-direction, the interpolation function may be expressed as:

$$f(x) = c(x) + \Sigma_{i=0}^n \lambda_i \phi(\|x-x_i\|) \tag{4}$$

In the above equation, c(x) is a first order polynomial that accounts for the linear, constant portions of $f$, $\lambda_i$ is a weight for each constraint, and $x_i$ are the locations of the scattered points (nodes). Specifically, the radial function $\phi$ was chosen as a thin plate spline, $\phi(r)=r^2 \log r$, as it gives $C^1$ continuity for smooth interpolation of the velocity field.

To solve for the set of weights $\lambda_i$ so that the interpolation satisfies the constraints $f(x_i)=U_i$, the equation is solved by evaluating each node at equation (4) (for example, $U_i=c(x_i)+\Sigma_{j=0}{}^n\lambda_j\phi(\|x_i-x_j\|)$).

Since the equation is linear in the unknowns, it can be formulated as a linear system:

$$\begin{bmatrix} A & Q \\ Q^T & 0 \end{bmatrix}\begin{bmatrix} \lambda \\ c \end{bmatrix} = \begin{bmatrix} U \\ 0 \end{bmatrix},$$

$$Q = \begin{bmatrix} 1 & x_1 & y_1 \\ \vdots & \vdots & \vdots \\ 1 & x_n & y_n \end{bmatrix},$$

where $\lambda=[\lambda_1, \ldots, \lambda_n]^T$, $c=[c_1\ c_2\ c_3]^T$ and n×n matrix $A=(a_{ij})=\phi(\|x_i-x_j\|)$.

Figure 5:
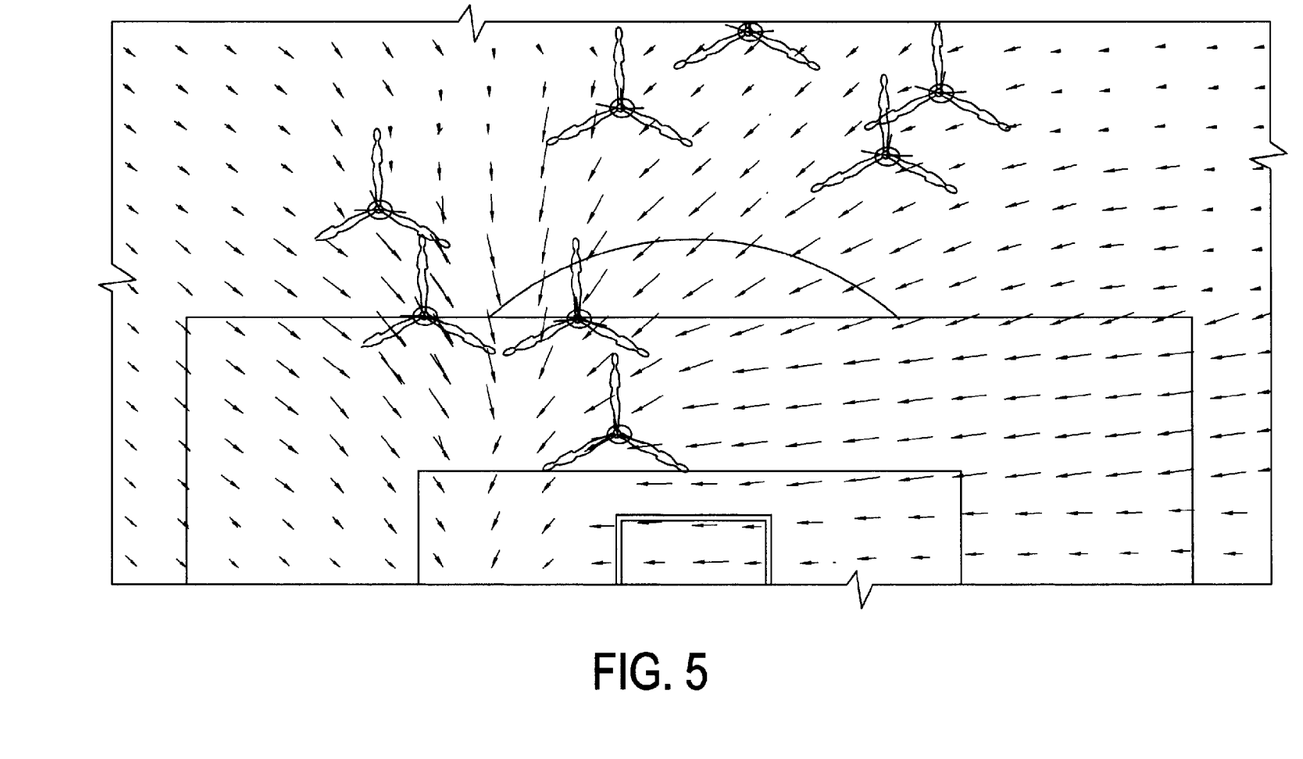
FIG. 5 illustrates an example ground flow field.

Once the system is solved, the interpolated velocity of the x-direction at any location $x_a(x_a,y_a)\in I^{top}$ can be evaluated as: $u_a=c_1+c_2 x_a+c_3 y_a+\Sigma_{i=1}{}^n\lambda_i\phi(\|x_i-x_j\|)$. The velocity of y-direction is interpolated similarly. For more temporally smooth transition the flow may be smoothed with 1×5 box filters. Such a flow is referred to herein as the motion field on the ground, and is denoted as $\Phi(x)=f(x)i+g(x)j=ui+vj$. This is illustrated in FIG. 5, where arrows represent the dense motion field generated from a sparse set of motions of players' movements. Note that for visualization purposes, the dense field is displayed sparsely by averaging the flow at each block.

Detecting Points of Convergence

Using the sport of soccer as a representative example, the motion field is been defined as a global or group tendency reflecting the play (or the strategy or intention of the players). In this context, a point of convergence (POC) is defined as the spatial location that play evolution is proceeding toward in the near future. Embodiments provide for detection of POC(s) of the game by finding locations where the motion field merges.

Point of convergence detection may be implemented in two steps. First, the motion field on the ground, $\Phi$, is used to propagate a confidence measure forward to calculate an importance table, $\Psi$, whose size is the same as $I^{top}$. Then, the accumulated confidences are clustered and a Gaussian Mixture Model is used to detect POC clusters.

The confidence value is defined as the local magnitude of velocity at any location on the ground. In a first step, this value is propagated (copied) at a fixed time t from each starting location through $\Phi$. Then, these values are accumulated along the trace in an importance table $\Psi$. Given a location, $x(i,j)\in I_t^{top}$, $\Psi$ is calculated by performing a forward propagation recursively based on the motion field $\Phi$. The magnitude of the velocity $\rho_{ij}{}^2=u_{ij}{}^2+v_{ij}{}^2$ is propagated by updating $\Psi$ as follows: $\Psi(i+u_{ij}, j+v_{ij})=\Psi(i+u_{ij}, j+v_{ij})+\rho_{ij}$. This forward propagation is continued along the motion field until the attenuation that is proportional to $\rho_{ij}$ is smaller than $\epsilon$ (converges close to zero). Consequently, locations having a large $\rho$ in $\Phi$ can have a large influence on far away locations as long as the motion field moves in that direction.

Figure 6A:
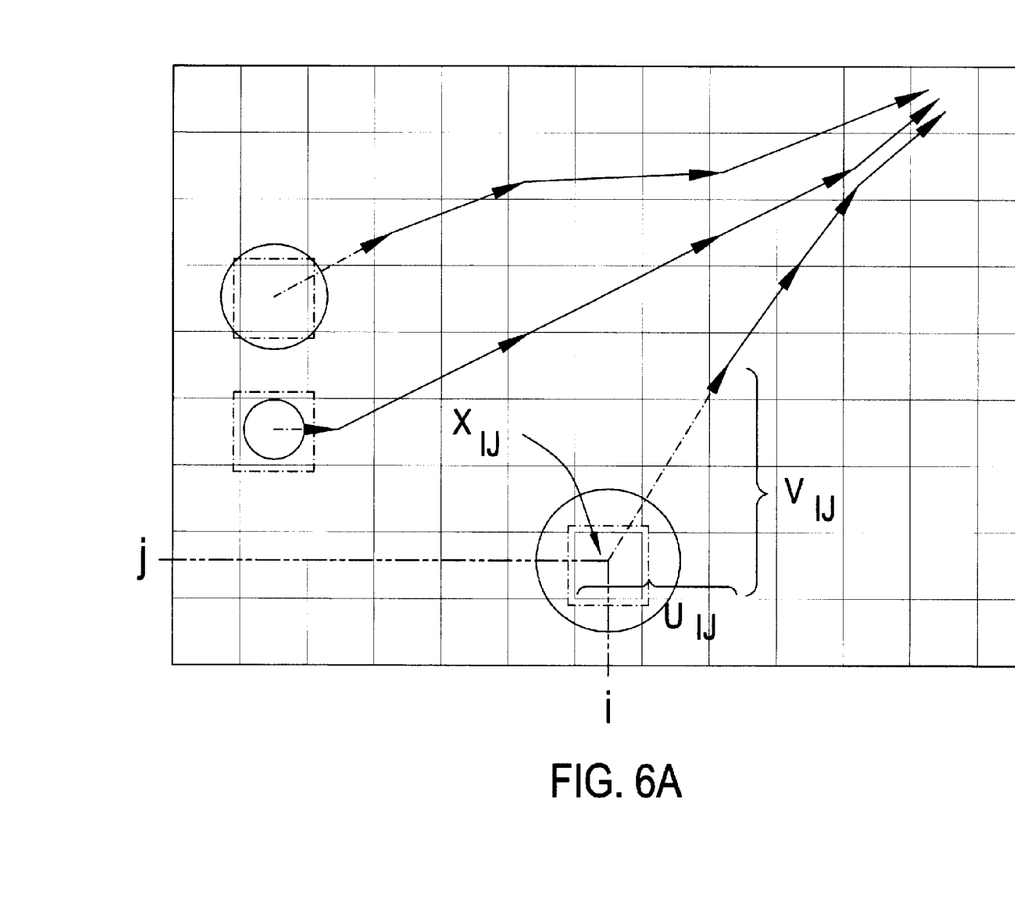
Figure 6B:
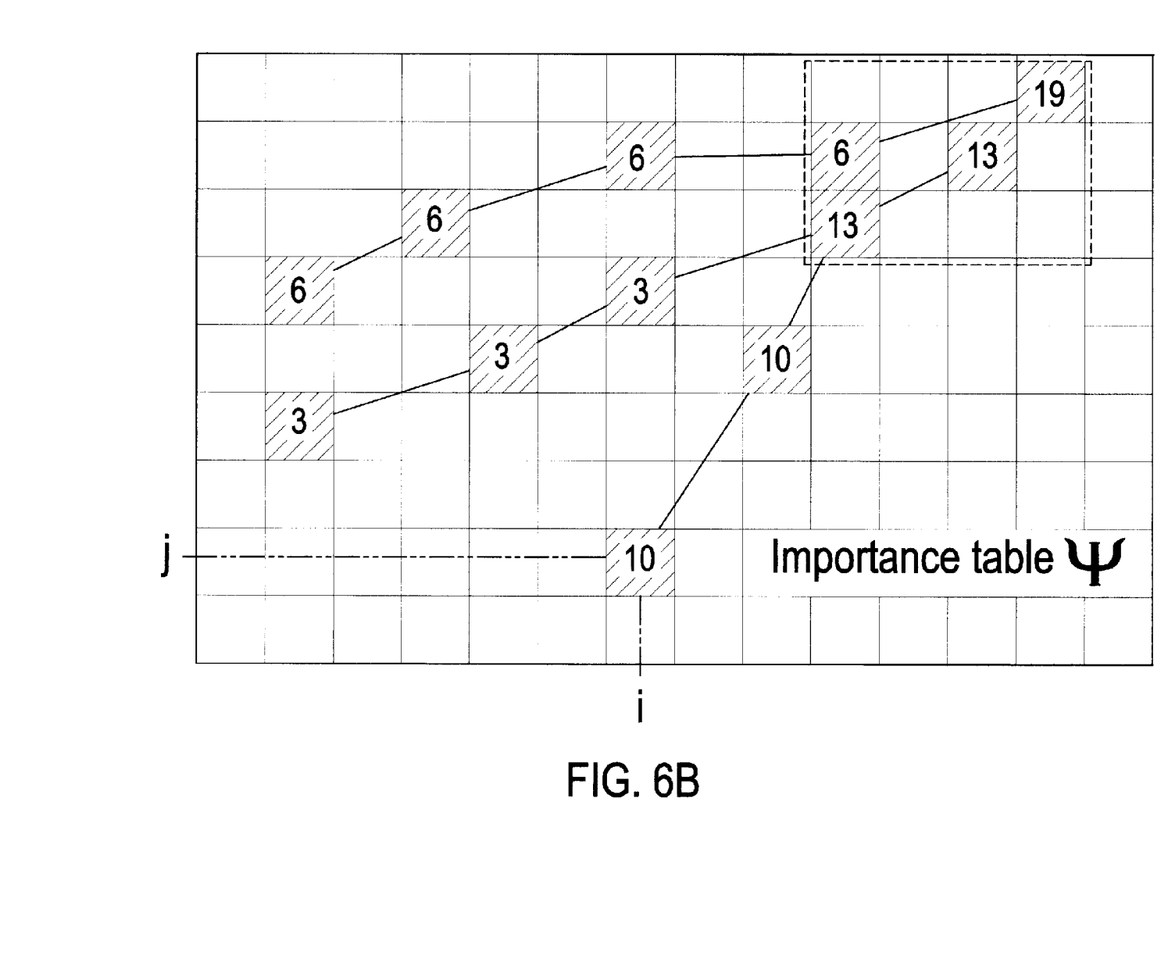
Figure 6C:
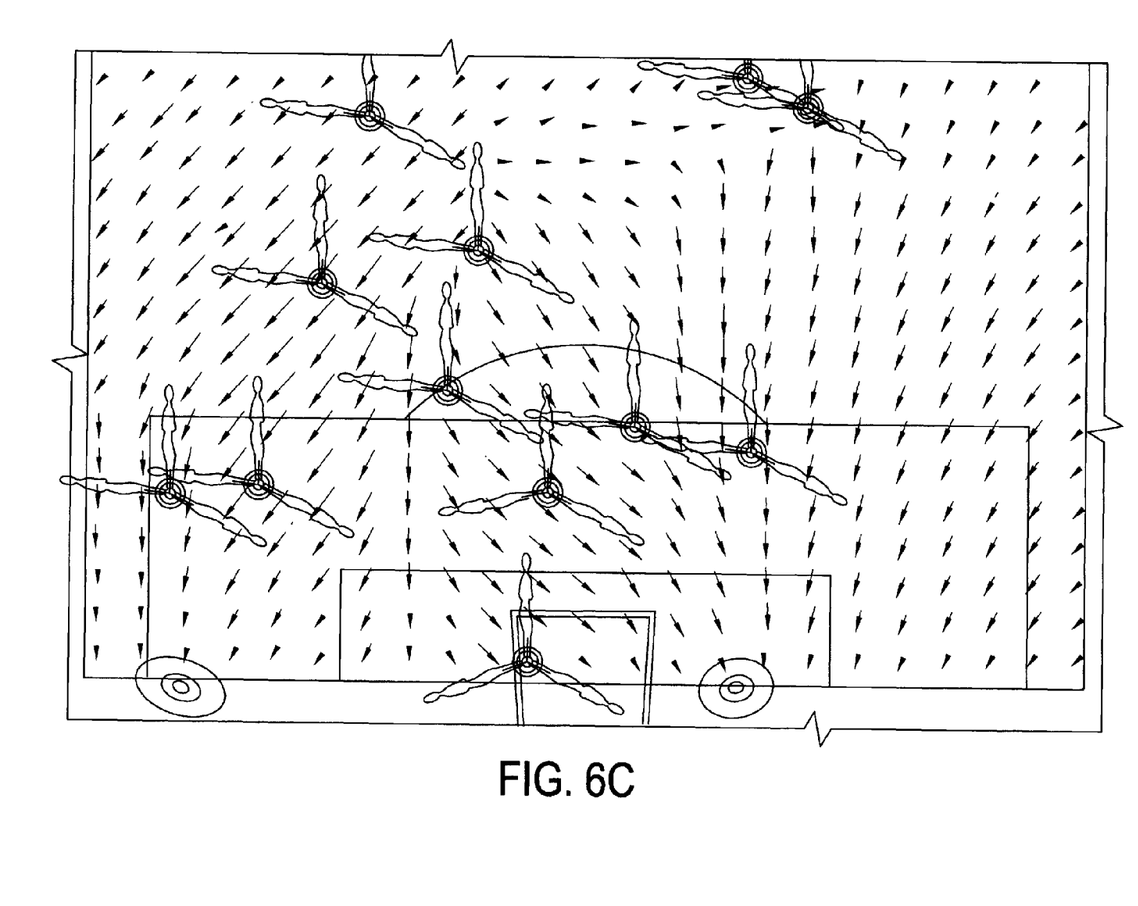

FIG. 6(A-C) illustrates an example of how POC(s) can be automatically detected from a motion field $\Phi$. In FIG. 6A, starting from the position on $x_{ij}$ and another point having a different magnitude motion vector as an example, the magnitude of $\rho_{ij}$ is propagated through the point $(i+u_{ij}, j+v_{ij})$. In FIG. 6B, an importance table $\Psi$ is updated by adding propagated confidence along $\Phi$. The location where the accumulated importance is high enough (for example, exceeds a predetermined threshold, with larger being equivalent to higher confidence) can be determined. In FIG. 6C, meanshift clustering and Guassina Mixture Modeling detects two POCs in this case, illustrated near the lower portion of FIG. 6C by circles.

Thus, the accumulated distribution of confidence is computed by determining confidence propagation for any location in $I^{top}$. To determine the location and the number of POCs at a given frame k, meanshift clustering may be applied to find an optimal number of clusters. Based on the initial mean and the number of clusters (modes), a Gaussian Mixture Model is fit to the distribution of those regions using Expectation Maximization (EM). Note that POC detection is different than classical singular (critical) point(s) detection. Primarily, POC is a global measurement of the flow, while the critical point is a local extremum of the velocity potential and the stream functions.

The divergence of the motion field $\Phi(x)$ at the location $x\in I^{top}$ is defined as $$div(\Phi(x)) = \nabla\Phi = \frac{\partial u}{\partial x} + \frac{\partial v}{\partial y}.$$

If $\nabla\Phi$ is negative, the flux of the motion field across the boundary of the region is inward, while positive is outward. Thus, if the motion field flows to the boundary of a specific region, the divergence of the region becomes negative.

In practice, many of the detected POCs exist in regions where the local measurement of divergence becomes negative because the POC proceeds in the direction of the motion field flow. Therefore, in many cases, a POC exists where there is a significant singular sink point. However, if the majority of flows in a specific scene are not regular enough to construct an apparent local extremum, determining a POC by detection of singularities will fail. In such cases, a forward-propagation method (as described herein) can still locate regions of major global flows that signify positions where the play evolution may proceed to.

Embodiments may be used in a wide variety of applications. Two example applications in the sports domain may include automatic device control (such as controlling cameras, lighting devices, et cetera) and visualization analysis. For automatic camera control (which may include camera positioning and/or selection), embodiments may be utilized to estimate where the important events will happen without accessing future video frames. This is important for automated live broadcasting.

For example, camera selection may include determining one or more points of convergence in a scene, and then utilizing the point(s) to provide camera selection(s) from among a plurality of cameras. Such camera selection may be implemented as in an automated way, such that a camera positioned most appropriately to capture a point of convergence is automatically selected to provide video for a broadcast. Similarly, a proposed camera selection may be provided such that a producer may choose from among cameras capturing the point of convergence, which he or she may then select manually. With regard to the example of camera positioning, to mimic human camera operators, an algorithm should control the pan and zoom of cameras and direct them towards regions of importance while maintaining smooth transitions and good field of view (FOV) framing.

Figure 7:
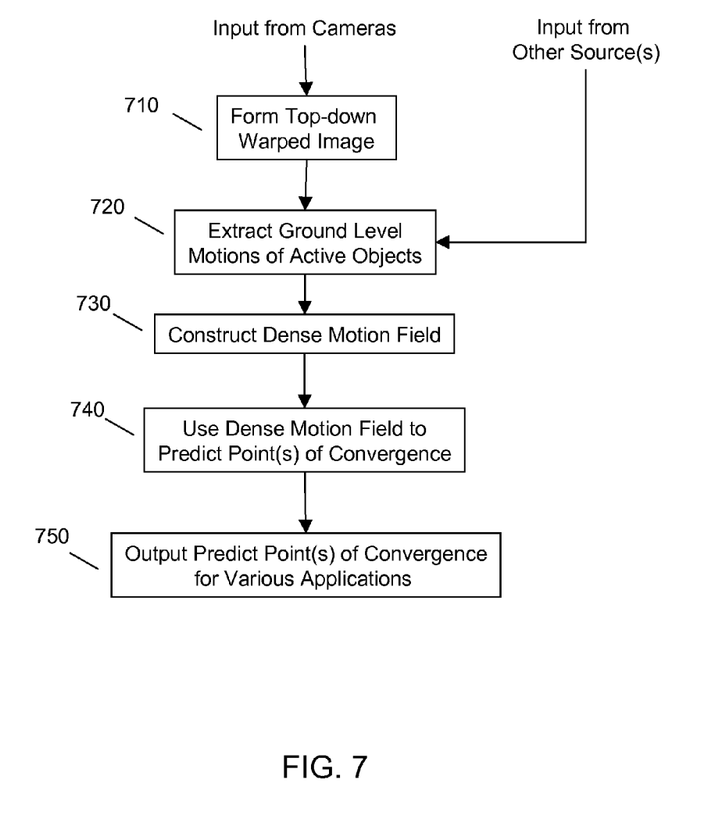
FIG. 7 illustrates an example of predicting points of convergence.

As an example, referring to FIG. 7, given input from multiple cameras, an embodiment forms a top down warped image and extracts the ground level motions of the players 710. It should be noted that, as described herein, other sources of positioning data may be utilized, and these may not require use of camera input and/or forming of a warped image. In any event, the ground level motions are used to construct the dense motion field at 730, and the dense motion field is in turn used to predict point(s) of convergence at 740. Given point(s) of convergence, an embodiment may output the point(s) of convergence at 750 for use in various applications, such as providing the output to cameras for control in an automated fashion.

Thus, for example, embodiments may be utilized to provide POC detection to forecast future important events, and control a camera by using cropped windows. Note, that this does not necessarily mean that the ball is always centered in the frame, which may provide richer context of the scene, and (2) the movement of the FOV may be smoothed based on the play evolution.

For sports visualization and analysis, embodiments similarly provide for tracking the location, the number, and the size of POC(s) for a good indication of interesting and important events during a game. This may be a useful tool for analyzing games (for example, by coaches and trainers, or by broadcasters during a live game) to show novel views of the game. Thus, the various applications may include visualization and analysis such as steering a crop window in the video images; defining a region of interest to a virtual camera (for example, taking a region out of an image to synthesize a new view), assisting in play analysis associated with the video images; visualizing and analyzing player movements from the video images; providing one or more virtual indicators (for example, arrows) showing where one or more players are moving; and/or providing predictive visualization information.

As described herein, evaluation of sports scenes captured by video images are used herein as non-limiting examples. Embodiments may access data from other sources, such as positioning data for objects tracked in a variety of ways. These objects may be tracked as they take part in other types of evolving scenes, such as movement of large crowds and the like.

It will be readily understood that embodiments may be implemented as a system, method, apparatus or computer program product. Accordingly, various embodiments may take the form of an entirely hardware embodiment, an entirely software embodiment (including firmware, resident software, micro-code, etc.) or an embodiment combining software and hardware aspects. Furthermore, embodiments may take the form of a computer program product embodied in one or more computer readable medium(s) having computer readable program code embodied therewith.

Any combination of one or more computer readable medium(s) may be utilized. The computer readable medium may be a non-signal computer readable storage medium. A computer readable storage medium may be, for example, but not limited to, an electronic, magnetic, optical, electromagnetic, infrared, or semiconductor system, apparatus, or device, or any suitable combination of the foregoing. A computer readable storage medium may be any tangible medium that can contain, or store a program for use by or in connection with an instruction execution system, apparatus, or device.

Computer program code for carrying out operations various embodiments may be written in any combination of one or more programming languages, including an object oriented programming language such as Java™, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. The remote computer may be connected to the user's computer through any type of network, including a local area network (LAN) or a wide area network (WAN), or the connection may be made to an external computer.

It will be understood that the embodiments can be implemented by a computer executing a program of instructions. These computer program instructions may be provided to a processor of a special purpose computer, or other programmable data processing apparatus to produce a machine, such that the instructions, which execute via the processor of the computer or other programmable data processing apparatus, implement the functions/acts specified.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified.

The computer program instructions may also be loaded onto a computer, other programmable data processing apparatus, et cetera, to produce a computer implemented process such that the instructions which execute on the computer or other programmable apparatus provide processes for implementing the functions/acts specified.

Figure 8:
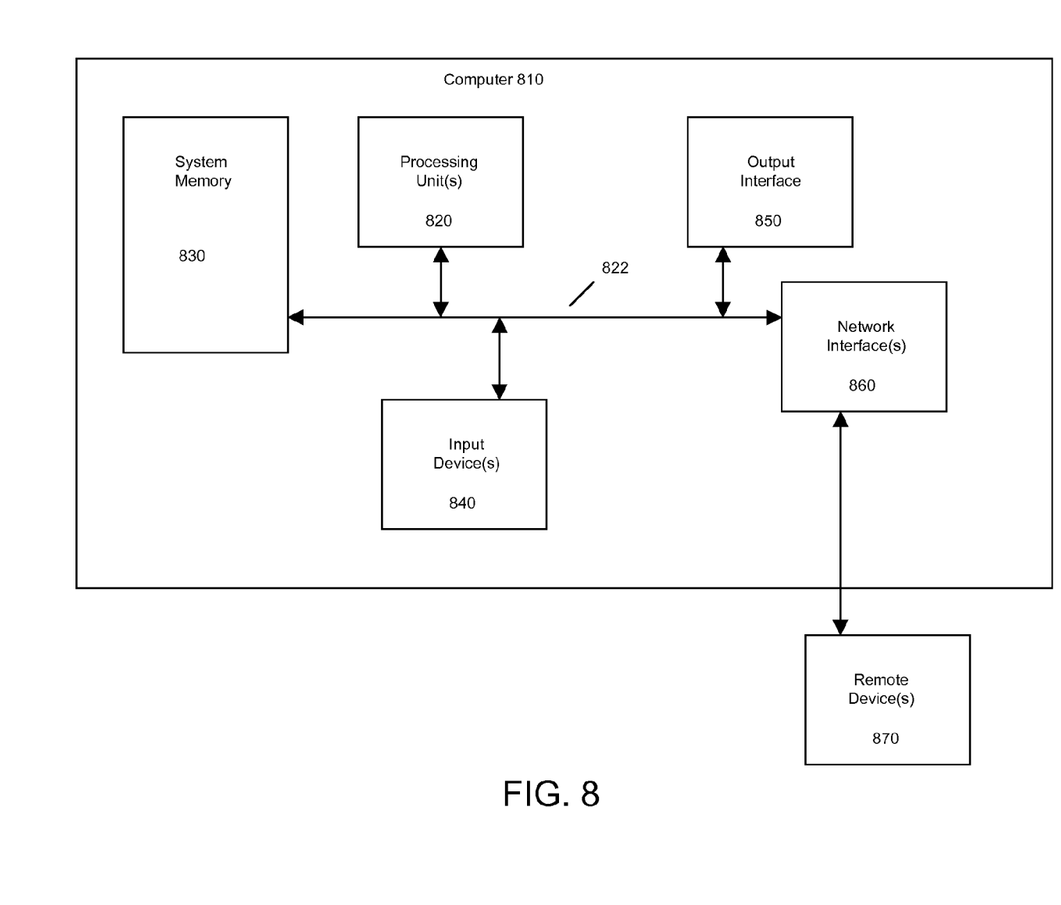
FIG. 8 illustrates an example computer system.

Referring to FIG. 8, it will be readily understood that certain embodiments can be implemented using any of a wide variety of devices or combinations of devices. An example device that may be used in implementing embodiments includes a computing device in the form of a computer 810. In this regard, the computer 810 may execute program instructions configured to analyze scenes as described herein and perform other functionality of the embodiments.

Components of computer 810 may include, but are not limited to, at least one processing unit 820, a system memory 830, and a system bus 822 that couples various system components including the system memory 830 to the processing unit(s) 820. The computer 810 may include or have access to a variety of computer readable media. The system memory 830 may include computer readable storage media in the form of volatile and/or nonvolatile memory such as read only memory (ROM) and/or random access memory (RAM). By way of example, and not limitation, system memory 830 may also include an operating system, application programs, other program modules, and program data.

A user can interface with (for example, enter commands and information) the computer 810 through input devices 840. A monitor or other type of device can also be connected to the system bus 822 via an interface, such as an output interface 850. In addition to a monitor, computers may also include other peripheral output devices. The computer 810 may operate in a networked or distributed environment using logical connections (network interface 860) to other remote computers or databases (remote device(s) 870). The logical connections may include a network, such local area network (LAN) or a wide area network (WAN), but may also include other networks/buses.

Thus, it is to be understood that certain embodiments provide systems, methods, apparatuses and computer program products configured for analyzing scenes. Certain embodiments focus on methods to build a global flow field from objects' (such as players) ground-level motions. Certain embodiments utilize the flow on the ground as it reflects the intentions of the group of individual objects based on the context (such as a game), and use this for understanding and estimating future events. Various example embodiments have been described in further detail herein. The details regarding the example embodiments provided are not intended to limit the scope of the invention but are merely illustrative of example embodiments.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein, it is to be understood that the embodiments of the invention are not limited to those precise embodiments, and that various other changes and modifications may be affected therein by one skilled in the art without departing from the scope or spirit of the disclosure.

What is claimed is:

1. A method for predicting evolution of motions of active objects comprising:
   accessing active object position data stored in a memory device, said active object position data including positioning information of a plurality of individual active objects, wherein said active object position data comprises active object position data derived from one or more sensors and comprises one or more of: object position data derived from a plurality of video images, object position data derived from one or more radio frequency devices, and object position data derived from radar; and
   using one or more processors to perform:
   extracting a plurality of individual active object motions from the active object position data;
   constructing a global flow field using the plurality of individual active object motions;
   using the global flow field to predict one or more points of convergence at one or more spatial locations that active objects are proceeding towards at a future point in time; and
   forming a top down warped image from the plurality of video images;
   wherein:
   the top down warped image is formed via warping and aligning the plurality of video images to create the top down warped image; and
   the top down warped image represents a top down view of a physical location.

2. The method according to claim 1, wherein:
   the physical location is a playing field;
   the plurality of individual active objects comprise players on the playing field; and
   the one or more spatial locations comprise locations on the playing field.

3. The method according to claim 1, further comprising using the one or more processors to perform:
   providing the one or more points of convergence to one or more cameras positioned about the physical location.

4. The method according to claim 3, further comprising positioning the one or more cameras to view the one or more points of convergence.

5. The method according to claim 1, further comprising using the one or more processors to perform one or more of:
   steering a crop window in one or more of the plurality of video images;
   defining a region of interest in one or more of the plurality of video images;
   providing one or more virtual indicators in one or more of the plurality of video images;
   visualizing and analyzing player movements associated with one or more of the plurality of video images;
   providing one or more virtual indicators in one or more of the plurality of video images showing where one or more players are moving; and
   providing predictive visualization information in one or more of the plurality of video images.

6. The method according to claim 1, further comprising utilizing the one or more processors to provide one or more camera selections based on the one or more points of convergence.

7. The method according to claim 1, wherein the global flow field comprises a dense motion field constructed from smooth velocity fields matching the plurality of individual active object motions.

8. The method of claim 1, further comprising using the one or more processors to perform:
   moving and aggregating test samples associated with confidence measures along the global flow field to calculate candidate points of convergence.

9. The method according to claim 8, wherein to calculate candidate points of convergence from further comprises:
   propagating distributions of aggregated confidences; and
   using a meanshift and a Gaussian Mixture Model to compute a location in the motion field where the aggregated confidences are maximized.

10. The method according to claim 9, further comprising using the one or more processors to perform:
    given one or more candidate points of convergence, defining a region of interest using the one or more candidate points of convergence.

11. The method of claim 1, further comprising using the one or more processors to perform:
    defining a region of interest using the one or more candidate points of convergence;
    wherein the region of interest does not currently contain any of the plurality of individual active objects.

12. A computer program product comprising:
    a non-transitory computer readable storage medium having computer readable program code embodied therewith, the computer readable program code comprising:
    computer readable program code configured to access active object position data, said active object position data including positioning information of a plurality of individual active objects, wherein said active object position data comprises active object position data derived from one or more sensors and comprises one or more of: object position data derived from a plurality of video images, object position data derived from one or more radio frequency devices, and object position data derived from radar;
    computer readable program code configured to extract a plurality of individual active object motions from the active object position data;

computer readable program code configured to construct a global flow field using the plurality of individual active object motions;

computer readable program code configured to use the global flow field to predict one or more points of convergence at one or more spatial locations that active objects are proceeding towards at a future point in time; and computer readable program code configured to form a top down warped image from the plurality of video images; wherein:

the top down warped image is formed via warping and aligning the plurality of video images to create the top down warped image; and the top down warped image represents a top down view of a physical location.

13. The computer program product according to claim 12, further comprising computer readable program code configured to provide the one or more points of convergence to one or more cameras positioned about the physical location.

14. The computer program product according to claim 12, further comprising computer readable program code configured to perform one or more of:

steering a crop window in one or more of the plurality of video images;

defining a region of interest in one or more of the plurality of video images;

providing one or more virtual indicators in one or more of the plurality of video images;

visualizing and analyzing player movements associated with one or more of the plurality of video images;

providing one or more virtual indicators in one or more of the plurality of video images showing where one or more players are moving; and providing predictive visualization information in one or more of the plurality of video images.

15. The computer program product according to claim 12, wherein the global flow field comprises a dense motion field constructed from smooth velocity fields matching the plurality of individual active object motions.

16. The computer program product according to claim 12, further comprising computer readable program code configured to perform:

moving and aggregating test samples associated with confidence measures along the global flow field to calculate candidate points of convergence;

wherein to calculate candidate points of convergence from further comprises:

propagating distributions of aggregated confidences; and using a meanshift and a Gaussian Mixture Model to compute a location in the motion field where the aggregated confidences are maximized.

17. The computer program product according to claim 12, further comprising computer readable program code configured to, given one or more candidate points of convergence, define a region of interest using the one or more candidate points of convergence.

18. A system comprising:

one or more processors; and a memory device operatively connected to the one or more processors;

wherein, responsive to execution of program instructions accessible to the one or more processors, the one or more processors are configured to:

access active object position data, said active object position data including positioning information of a plurality of individual active objects, wherein said active object position data comprises active object position data derived from one or more sensors and comprises one or more of: object position data derived from a plurality of video images, object position data derived from one or more radio frequency devices, and object position data derived from radar; and extract a plurality of individual active object motions from the active object position data;

construct a global flow field using the plurality of individual active object motions;

use the global flow field to predict one or more points of convergence at one or more spatial locations that active objects are proceeding towards at a future point in time; and form a top down warped image from the plurality of video images;

wherein:

the top down warped image is formed via warping and aligning the plurality of video images to create the top down warped image; and the top down warped image represents a top down view of a physical location.

* * * * *